(12) United States Patent
Ogura

(10) Patent No.: US 8,651,215 B2
(45) Date of Patent: Feb. 18, 2014

(54) MOTOR DRIVEN VEHICLE

(75) Inventor: Hideo Ogura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 239 days.

(21) Appl. No.: 13/232,027

(22) Filed: Sep. 14, 2011

(65) Prior Publication Data

US 2012/0067659 A1    Mar. 22, 2012

(30) Foreign Application Priority Data

Sep. 17, 2010    (JP) .................................. 2010-209479

(51) Int. Cl.
 *B60K 1/00*    (2006.01)
(52) U.S. Cl.
 USPC ............................ 180/291; 180/65.6; 180/219
(58) Field of Classification Search
 USPC .......... 280/284; 180/218, 219, 220, 221, 223, 180/226, 227, 228, 291; 290/1 R, 1 C
 See application file for complete search history.

(56) References Cited

U.S. PATENT DOCUMENTS

| 2007/0090703 A1* | 4/2007 | Yeh ................................. 310/83 |
| 2008/0128190 A1* | 6/2008 | Tsutsumi et al. ............. 180/219 |
| 2012/0137809 A1* | 6/2012 | Kim ................................ 74/431 |

FOREIGN PATENT DOCUMENTS

JP    2894157    3/1999

* cited by examiner

*Primary Examiner* — John Walters
*Assistant Examiner* — James Triggs
(74) *Attorney, Agent, or Firm* — Rankin, Hill & Clark LLP

(57) ABSTRACT

In a motor driven vehicle in which an electric motor is disposed in a vehicle-body-rear portion of a swing arm swingably supported by a body frame and the vehicle travels by transmitting the drive force of the electric motor to a rear wheel, a vibration generating device for generating vibration in accordance with the transmitted drive force is installed on a drive force transmission path from the electric motor to the rear wheel. The vibration generating device includes a gear pair partially embedded with respective weights to lose a rotational balance during rotation. A sound producing device for producing a predetermined sound in accordance with the transmitted drive force is installed on the same transmission path. The sound producing device is driven by a transmitting device reciprocating through contact with a cam attached to a reduction gear serving as a rotating body.

18 Claims, 10 Drawing Sheets

MOTOR DRIVEN VEHICLE

BACKGROUND OF THE INVENTION

1. Field of the Invention

The present invention generally relates to motor driven vehicles and, in particular, to a motor driven vehicle that travels by allowing electric power supplied from an in-vehicle battery to drive a motor, which serves as a power source.

2. Description of Related Art

It has heretofore been recognized that motor driven vehicles equipped with an electric motor as a power source have a problem in that they do not produce vibrations or sounds comparable to those produced by internal combustion engine vehicles. Therefore, it is difficult for an occupant to sensuously grasp the condition of the vehicle. Various methods have been studied to deal with such a problem.

For example, Japanese Patent No. 2894157 discloses a motor driven vehicle that includes a vibration generator and an announcing device. The vibration generator allows a handlebar grip to generate vibration by device of an eccentric weight turning inside the handlebar grip. The announcing device allows a speaker attached to a vehicle body to emit an announcing sound resembling an engine sound.

However, the technology described in Japanese Patent No. 2894157 provides only pseudo vibration generated in the handlebar grip portion and pseudo sound reproduced by the speaker. That is to say, the technology does not provide actual vibration and sound occurring in conjunction with the drive of the drive source. In short, these vibration and sound are unlike ones obtained through riders' senses. Thus, sensuously grasping the conditions of the vehicle remains a difficult problem.

SUMMARY OF THE INVENTION

The present invention is directed toward solving the problem of the conventional technology mentioned above and to provide a motor driven vehicle that can provide vibration, sound, etc., fitted to riders' senses in conjunction with the drive of an electric motor.

In accordance with the present invention, a motor driven vehicle includes an electric motor disposed in a vehicle-body-rear portion of a swing arm and is swingably supported by a body frame. The vehicle travels by transmitting a drive force of the electric motor to a rear wheel. The vehicle includes a vibration generating device for generating vibration in accordance with the drive force. The vibration generating device is installed on a drive force transmission path from the electric motor to the rear wheel. Therefore, the drive force of the electric motor is utilized and the vibration in accordance with the rotational speed (rotation number) of the electric motor is generated. Thus, the vibration fitted to the riders' senses can be obtained and because of the vibration, the conditions of the vehicle body can be grasped sensuously.

In further accordance with the present invention, the vibration generating device is composed of rotating bodies that lose rotational balance during rotation. Therefore, vibrations in accordance with the rotational speed (rotation number) of the electric motor can be provided with a simple configuration.

According to another aspect of the invention, the rotating bodies are a gear pair partially embedded with a weight. Therefore, the degree of vibration can easily be adjusted by the setting of the weight. Rather than providing a constant vibration, combining the variations in both the rotation balances of the gear pair can provide a pulsation-varying vibration.

According to a further feature of the invention, the vibration generating device preferably rotates a plurality of times for each rotation of the electric motor. Therefore, smaller magnitude vibrations can easily be provided (e.g. two vibrations in one rotation of the rear axle driven by the electric motor). In addition, the vibration having a pulsating feeling can be obtained.

In further accordance with the present invention, the sound producing device for producing a predetermined sound in accordance with the transmitted drive force is installed on the drive force transmission path from the electric motor to the rear wheel. The sound in accordance with the rotational speed (rotation number) of the electric motor can be produced by the sound producing device in addition to the vibration generated by the vibration generating device. This provides vibrations and sounds fitted to the riders' senses and further the conditions of the vehicle can sensuously be grasped.

In further accordance with the present invention, the sound producing device is driven by the transmitting device reciprocally through contact with the cam attached to the rotating body. Therefore, the produced sound can easily be adjusted by varying the shape of the cam. Further, the cam is provided with a weight adapted to achieve rotational balance of the cam at a position opposed to a predetermined cam lobe formed on an outer circumferential portion of the cam. Therefore, the occurrence of vibration caused by the loss of rotational balance due to the weight of the cam can be suppressed to make it possible to prevent an influence from being exerted on the vibration intended by the vibration generating device.

In accordance with another aspect of the invention, the vibration generating device and a sound producing device are each configured to be driven by a drive force taken from an axle of the rear wheel. Therefore, the vibration generating device and the sound producing device can easily be disposed close to the axle of the rear wheel. Thus, the drive force transmission path from the electric motor can be reduced in length and the vibration generating device and the sound producing device can easily be disposed in otherwise dead space around the rear end of the swing arm.

Further, a portion of the vibration generating device and the sound producing device are each removable from the swing arm. Therefore, it is easy to set the vibration generating device and the sound producing device as optional parts and to arbitrarily select whether to install the vibration generating device and/or the sound producing device.

In further accordance with the present invention, the sound producing device is disposed inside the swing arm at a position rearward of an axle of the rear wheel, as viewed from the side of the vehicle body. Therefore, it becomes possible to effectively utilize what would otherwise be dead space around the rear end portion of the swing arm.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
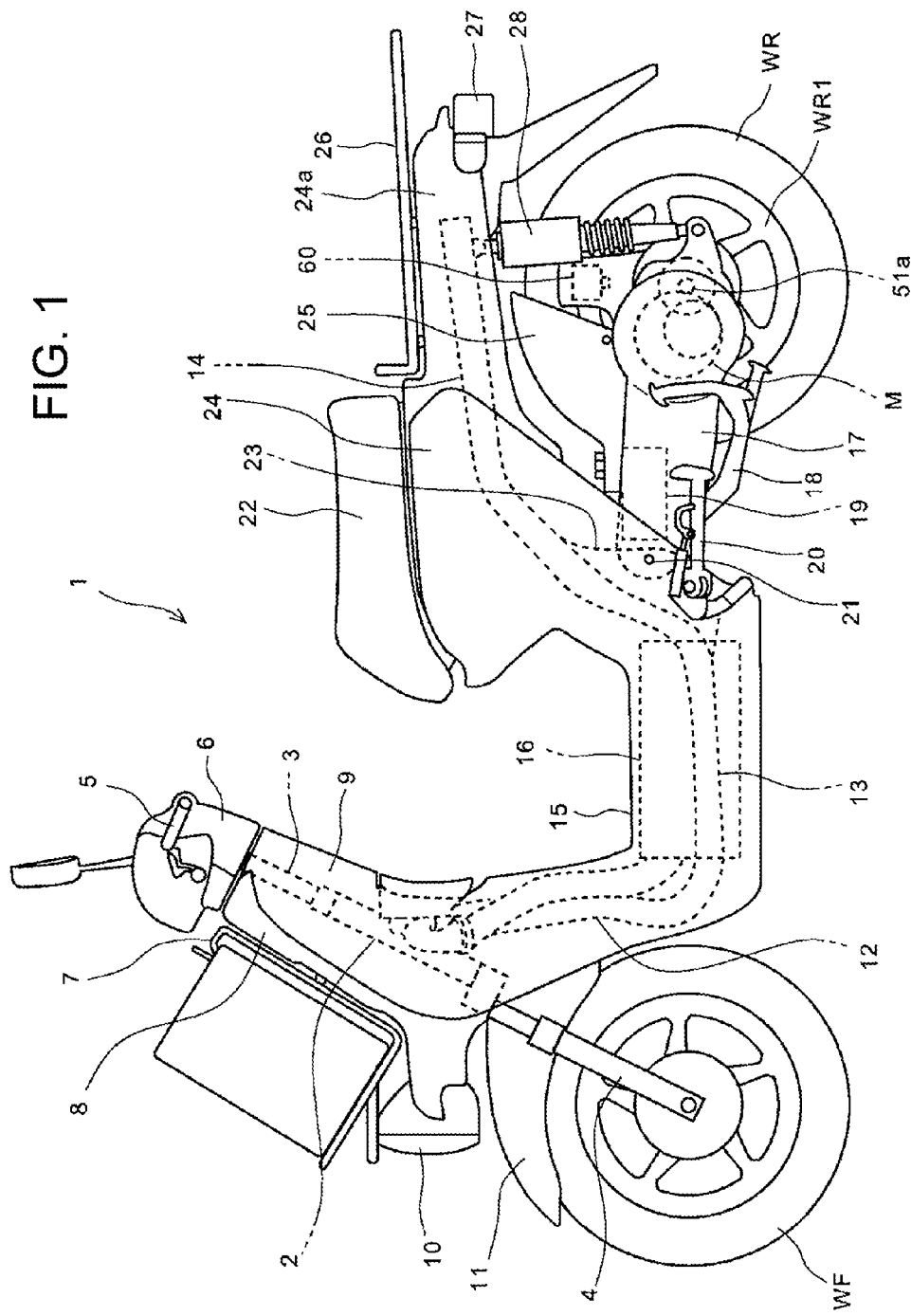
FIG. 1 is a lateral view of a motor driven vehicle according to a first embodiment of the present invention.

Preferred embodiments of the present invention will be described in detail with reference to the drawings. FIG. 1 is a side view of a motor driven vehicle 1 according to an embodiment of the present invention. The motor driven vehicle 1 is a scooter-type two-wheeled vehicle having a low-floor 15 and is configured to drive a rear wheel WR by the rotation-drive force of an electric motor M installed in a swing arm 17. A high-voltage battery 16 adapted to supply electric power to an electric motor M can be charged by connecting an external electric source with a charging plug (not shown) installed at a lower portion or the like of a seat 22.

A head pipe 2 turnably supporting a steering stem 3 is joined to a front end portion of a main frame (a body frame) 12. A steering handlebar 5 is mounted to the upper portion of the steering stem 3. In addition, a pair of front forks 4 is mounted to the lower portion of the steering stem 3. A front wheel WF is rotatably be supported by the lower end portion of the front forks 4.

A pair of left and right lower frames 13 is joined to the lower portion of the main frame 12. The high-voltage battery 16 is disposed between the left and right lower frames 13. The lower frames 13 bend upward at their rear sides and are joined to rear frames 14.

A pivot plate 23 having a swing arm pivot 21 is mounted to the rear portions of the lower frames 13. The swing arm pivot 21 swingably supports a cantilever-type swing arm 17 in which only an arm on the left side of the vehicle body supports a rear wheel WR.

The rear wheel WR is rotatably supported by an axle 51a at a rear portion of the swing arm 17. The rear wheel WR is configured by mounting a rubber tire on a metallic wheel WR1. The rear end portion of the swing arm 17 is suspended by the rear frame 14 via a rear cushion unit 28. A center stand 18 is attached to the lower surface of the swing arm 17. A side stand 20 is attached to the pivot plate 23.

A motor driver (PDU) 19 is located at a front portion of the swing arm 17 in the vehicle body. The motor driver 19 is adapted to convert direct current supplied from the high-voltage battery 16, into alternating current and supplies it to the electric motor M. A speed reduction mechanism is disposed on the rear side of the electric motor M. The speed reduction mechanism is adapted to reduce the rotational speed (rotation number) of the output shaft of the electric motor M at a given rate and transmit the reduced rotation to the axle 51a.

The widthwise central portion of the steering handlebar 5 is covered by a handlebar cover 6. A head pipe 2 is covered by a front cowl 8 on the front side of the vehicle body and a floor cover 9 on the rear side of the vehicle body. A carrier 7 is disposed on the front side of the front cowl 8. A headlight 10 is supported below the carrier 7 by the end of the forward extension of the vehicle body. A front fender 11 serving as a mud guard of the front wheel WF is mounted below the headlight 10.

A side cover 24 formed continuously right and left in the vehicle body is disposed vehicle-body-rearward of the low-floor 15 formed above the high-voltage battery 16. A seat 22 opened and closed by device of a hinge located on the front side of the vehicle body is mounted on the side cover 24. A seat cowl 24a is disposed rearward of the side cover 24 so as to cover the outside of the rear frame 14. A taillight device 27 is attached to the rear end portion of the seat cowl 24a. A luggage carrier 26 is secured rearward of the seat 22. A rear fender 25 serving as a mud guard of the rear wheel WR is mounted on the upper surface of the swing arm 17.

Figure 2:
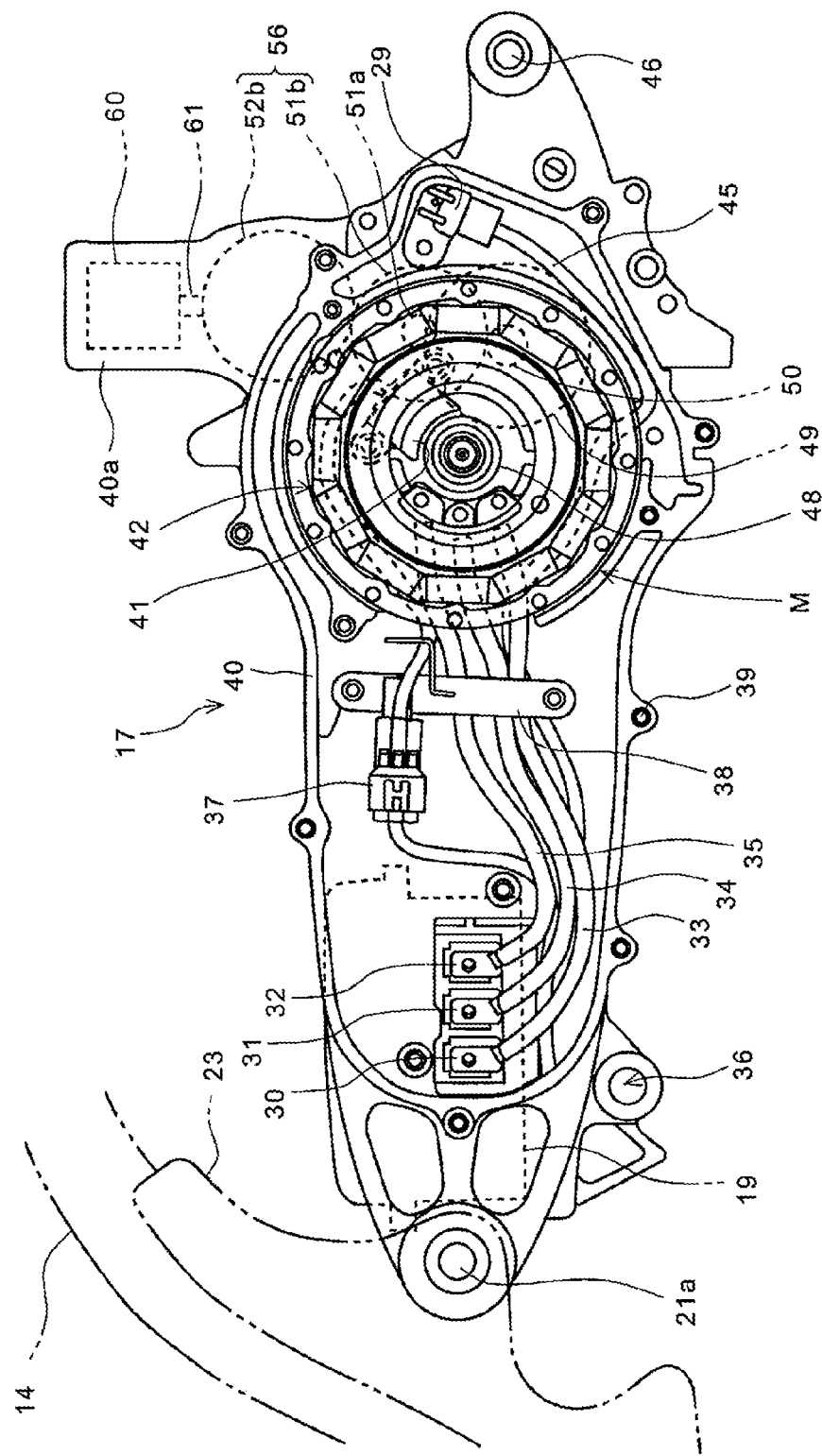
FIG. 2 is a lateral view of a swing arm.

FIG. 2 is a side view of the swing arm 17. The same reference symbols as those of the above denote like or corresponding portions. FIG. 2 illustrates a state where a swing arm cover (not shown) attached to a transmission case 40 from the vehicle-widthwise left side is removed from the transmission case 40 supporting major parts such as the electric motor M and the like. The transmission case 40 is formed with a plurality of fastening holes 39 at its outer circumferential portion and in its contact surface with the swing arm cover. The transmission case 40 is formed at its front end portion with a through-hole 21a adapted to receive the pivot shaft 21, which passes therethrough. The motor driver 19 is housed in a housing space having an opening portion on the upper surface side of the swing arm 17. The motor driver 19 is fitted in the housing space and disposed at a position close to the through-hole 21a and on the front side of the vehicle body.

The electric motor M is disposed in the swing arm 17 so as to be superposed on, i.e., overlap, the projection area of the rear wheel WR as viewed from the side of the vehicle body. A U-phase line 33, a V-phase line 34 and a W-phase line 35 are arranged as power supply lines between the motor driver 19 and the electric motor M. The three lines are each connected to the motor driver 19 via a corresponding one of terminals 30, 31, 32 and are brought close to an inner wall side by a guide plate 38 mounted to the transmission case 40.

The electric motor M is of an outer rotor type composed of a stator 42 secured to the transmission case 40 and a rotor 43 (see FIG. 3) secured to a motor drive shaft 48. A rotation speed sensor 41 of the electric motor M is disposed on the outer circumferential portion of the motor drive shaft 48. A connector 37 of the rotation speed sensor 41 is supported by the guide plate 38. A vehicle speed sensor 29 is disposed on the vehicle-body-rear side of the electric motor M. Also a line 45 of the vehicle speed sensor 29 is designed to pass on the vehicle-widthwise right side of the guide plate 38.

The transmission case 40 is formed in its lower portion with an attachment hole 36 of the center stand 18 (see FIG. 1). In addition, the transmission case 40 is formed at its rear end portion with a lower support hole 46 used to swingably support the lower end portion of the rear cushion unit 28.

The swing arm 17 of the present embodiment includes vibration generating device 56 for generating vibrations similar to the vibration of an internal combustion engine (an engine) and sound producing device 60 for producing sounds similar to the sound of the engine. The vibration generating device 56 is composed of a pair of gears including a gear constituting part of the speed reduction mechanism. The sound producing device 60 is disposed in the rear portion of the swing arm 17 and above the speed reduction mechanism composed of a plurality of gear pairs and is driven by the power taken from the speed reduction mechanism.

The rotational drive force of the electric motor M is transmitted from the output shaft 48 to the axle 51a while being reduced at a given rate by being mediated by a first reduction gear 49, a second reduction gear 50 and a third reduction gear 51b serving as a speed reduction mechanism. The third reduction gear 51b is meshed with a driven gear 52b having the same shape as that of the third reduction gear 51b. The sound producing device 60 is disposed above the driven gear 52b. Drive force transmitting device 61 is disposed between the driven gear 52b and the sound producing device 60. The driven gear 52b and the sound producing device 60 are housed in a housing case 40a protruding upward from the rear portion of the transmission case 40.

Figure 3:
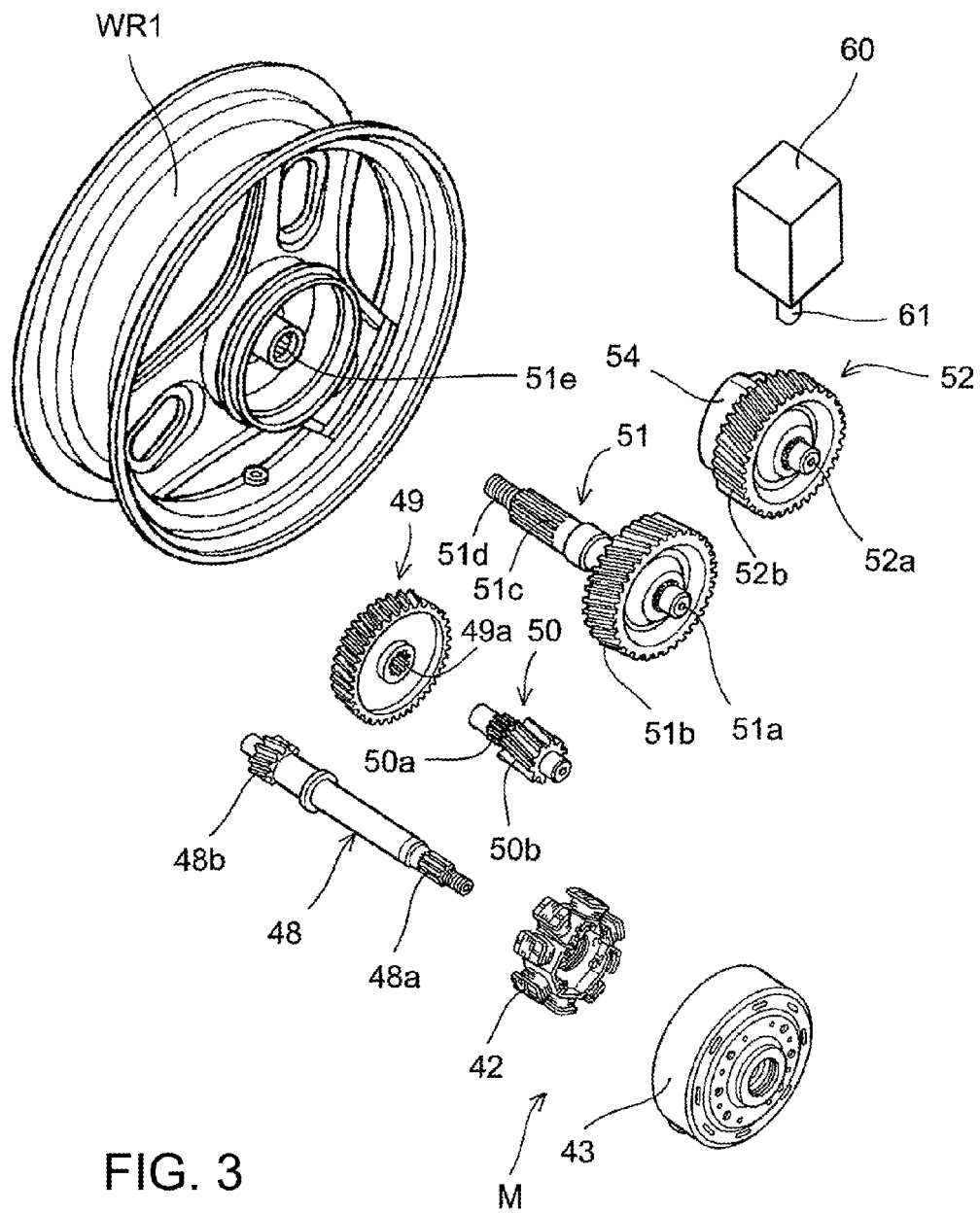
FIG. 3 is an exploded perspective view illustrating a configuration of a speed reduction mechanism, etc., housed in the swing arm.

FIG. 3 is an exploded perspective view illustrating the configuration of the speed reduction mechanism and the like housed in the swing arm 17. As described earlier, the outer rotor type electric motor M is composed of the stator 42 secured to the transmission case 40 and the rotor 43 non-rotatably connected to the output shaft 48. The outer circumference of one end portion of the output shaft 48 is formed with a spline 48a to which the rotor 43 is fitted. The other end of the output shaft 48 is formed with a gear 48b meshed with the first reduction gear 49.

A spline 50a formed on the shaft portion of the second reduction gear 50 is fitted to a spline 49a formed on a through-hole of the first reduction gear 49. A gear 50b formed on the second gear 50 is meshed with the third reduction gear 51b of a drive-side vibration generation unit 51.

The third reduction gear 51b is secured through spline-fitting to the axle 51a at a vehicle-widthwise leftward position to constitute part of the drive side vibration generating unit 51. The axle 51a is formed on the other end side with a spline 51c engaged with a spline 51e formed on the wheel WR1 and with a thread 51d threadedly engaged with a nut (not shown) used to secure the wheel WR1.

On the other hand, the driven gear 52b meshed with the third reduction gear 51b is secured through spline-fitting to a rotating shaft 52a at a vehicle-widthwise leftward position. The driven gear 52b, along with a cam 54 secured to the rotating shaft 52a for integral rotation with the driven gear 52b, constitutes a driven side vibration generation unit 52.

The sound producing device 60 formed like a rectangular parallelepiped is disposed at a position on the vehicle-body-upper side of the driven side vibration generating unit 52. Columnar transmitting device 61 projects from the lower surface of the sound producing device 60 and has a lower end portion in constant contact with the cam 54. The sound producing device 60 is configured to produce a predetermined sound through the reciprocation of the transmitting device 61. The transmitting device 61 reciprocates at a speed corresponding to the rotation speed of the driven gear 52b rotating integrally with the cam 54. Therefore, the sound emitted from the sound producing device 60 varies depending on the rotation speed of the electric motor M.

The sound producing device 60 is disposed inside the swing arm 17 at a position rearward of the axle 51a of the rear wheel WR as viewed from the side of the vehicle body. Therefore, a dead space defined around the rear end portion of the swing arm 17 can effectively be utilized and a transmission path for the drive force from the electric motor M to the sound producing device 60 can be reduced in length.

Figure 4:
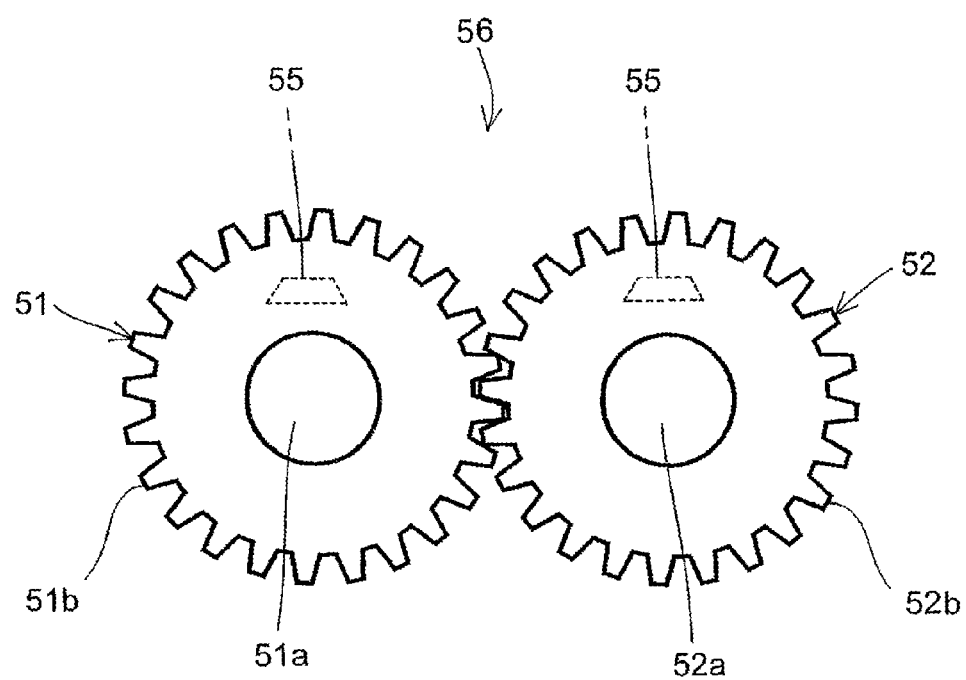
FIG. 4 is a schematic explanatory diagram of vibration generating device.

FIG. 4 is a configuration explanatory diagram of the vibration generating device 56. As described earlier, the vibration generating device 56 according to the present embodiment is composed of the third reduction gear 51b included in the drive side vibration generating unit 51 and a driven gear 52b included in the driven side vibrating unit 52. The third reduction gear 51b and the driven gear 52b each serving as a rotating body generating predetermined vibration have respective weights 55 embedded therein to positively lose the rotational weight balance of the gear. In the present embodiment, the third reduction gear 51b and the driven gear 52b are set so that when one of the weights 55 reaches the upper position in the figure, the other weight 55 may also reach the position corresponding to that of the one of the weights 55.

This configuration provides not only vibrations oriented in the vertical direction in the figure along with merely the rotation of the electric motor M but also large vibrations by the two weights 55 combining rotation balance variations. Incidentally, a configuration may be acceptable in which the embedded positions of the weights 55 are varied to vary the orienting direction of the vibration. Further, if the vibration generating device 56 is configured to rotate a plurality of rotations in one rotation of the electric motor M, smaller amplitude vibrations can easily be obtained.

Figure 5:
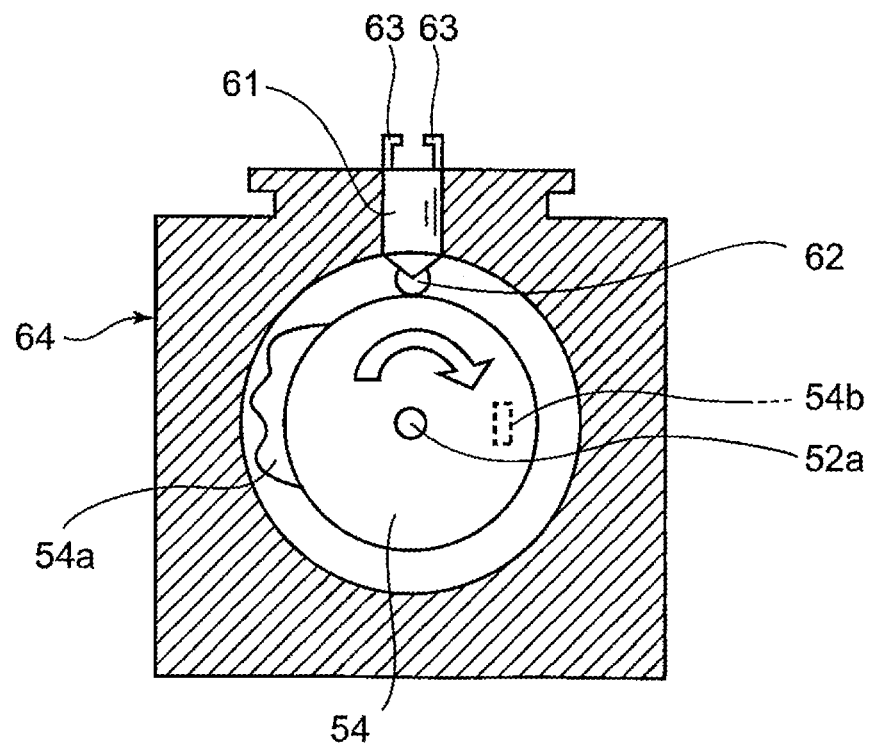
FIG. 5 is a schematic explanatory diagram illustrating the relationship between a cam and transmitting device.

FIG. 5 is a schematic explanatory diagram illustrating the relationship between the cam 54 and transmitting device 61. The same reference symbols as those in the above denote like or corresponding portions. The transmitting device 61 attached with a rotatable roller 62 at its end portion is supported slidably, vertically in the figure, with respect to a support case 64 mounted to the swing arm 17. On the other hand, the cam 54 is disposed at a predetermined position of the support case 64 so as to be rotated to vertically move the transmitting device 61 in accordance with the shape of a cam lobe 54a. Connectors 63 are attached to the upper end portion of the transmitting device 61. The shape of the cam lobe 54a can variously be changed to thereby adjust the produced sound.

Incidentally, in the present embodiment, the weight 54b adapted to achieve the rotation balance of the entire cam 54 is located at a position opposed to the predetermined cam lobe 54a formed on the outer circumferential portion of the cam 54. This can suppress the vibration generated by the rotation of the cam 54. Thus, it is possible to prevent an influence from being exerted on the vibration intended by the vibration generating device 56.

In the present embodiment, the driven side vibration generating unit 52 constituting the vibration generating device 56 and the sound producing device 60 are configured to be removable from the swing arm 17. This can set the vibration generating device 56 and the sound producing device 60 as optional parts on a standard vehicle. That is to say, the vibration generating device 56 and the sound producing device 60 can be installed later as necessary. Incidentally, if the vibration generating device 56 and the sound producing device 60 are not installed, the weight 55 of the third reduction gear 51b of the drive side vibration generating unit 51 can be removed.

Figure 6:
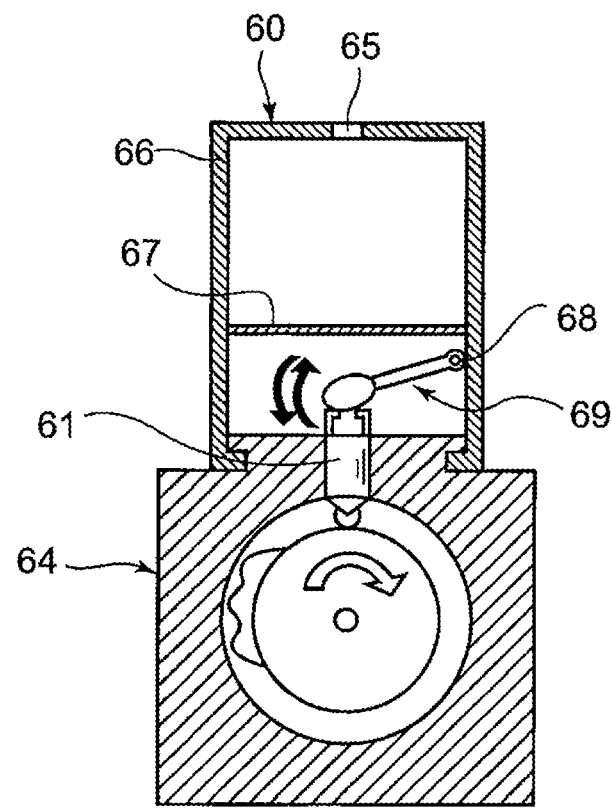
FIG. 6 is a schematic explanatory diagram illustrating an embodiment of sound producing device according to the embodiment of the present invention.

FIG. 6 is a schematic explanatory diagram illustrating an embodiment of the sound producing device 60 in the embodiment of the present invention. In this embodiment, a striking rod 69 supported swingably around a swing shaft 68 is installed in a housing 66 of the sound producing device 60. A film-like skin 67 is put above the striking rod 69. The transmitting device 61 reciprocates vertically, so that the striking rod 69 strikes the skin 67 to sound. The sound producing device 60 with this "drum specification" can emit such sounds as resulting from continuously striking a drum. Incidentally, the upper surface of the housing 66 is formed with a venting hole 65 adapted to diffuse the sound. The sound producing device 60 as described above can positively generate also vibration along with sound unlike the sound caused by a speaker or the like and provide a feeling of pulse. Thus, an occupant's sensuous effect can be more enhanced.

Figure 7:
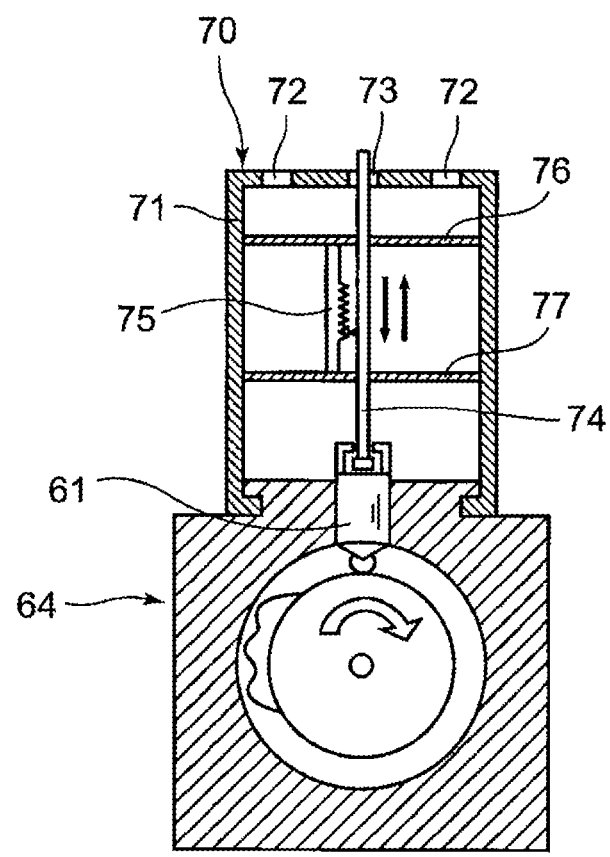
FIG. 7 is a schematic explanatory diagram of sound producing device according to a modified example of the present invention.

FIG. 7 is a schematic explanatory diagram of sound producing device 70 according to a modified example of the present invention. In the present modified example, two films 76, 77 spaced vertically apart from each other and a rubbed member 75 supported by the films 76, 77 and having a projected and recessed shape (a jagged surface shape or texture) are installed inside a housing 71 of the sound producing device 70. On the other hand, a performance rod 74 with a projection is attached to the transmitting device 61. When the transmitting device 61 reciprocates vertically, the projected and recessed shape of the rubbed member 75 and the projection of the performance rod 74 rub each other to emit a sound. The sound producing device 70 having this "guiro specification" can emit such sounds as resulting from continuously playing a guiro (a percussion instrument in which the outer skin of a hollow gourd is notched and rubbed with a rod to sound) along with the rotation of the electric motor M. Incidentally, the upper surface of the housing 71 is formed with a through-hole 73 for the performance rod 74 and venting holes 72.

Figure 8:
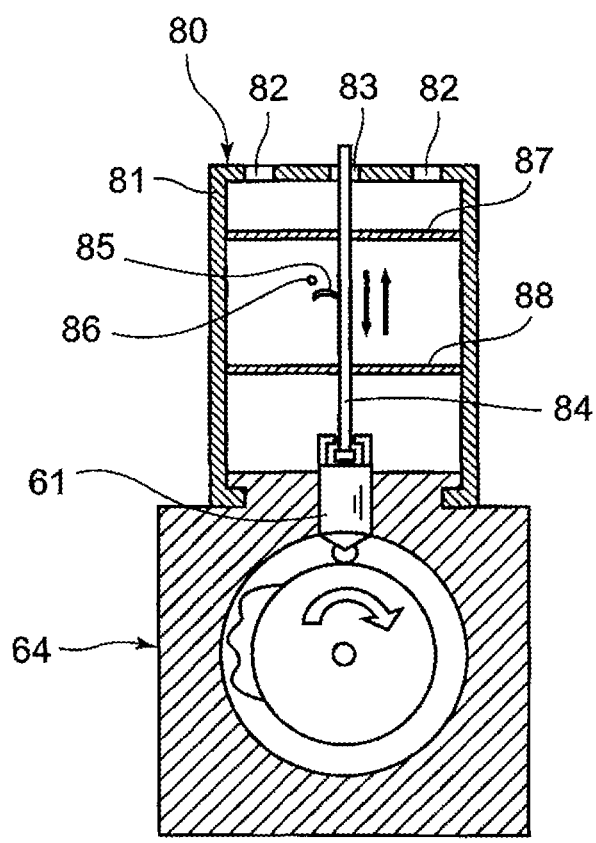
FIG. 8 is a schematic explanatory diagram illustrating sound producing device according to a second modified example of the present invention.

FIG. 8 is a schematic explanatory diagram of sound producing device 80 according to a second modified example of the present invention. Two films 87, 88 spaced vertically apart from each other and a string 86 stretched at a predetermined tension are installed inside the housing 81 of the sound producing device 80. On the other hand, a performance rod 84 with a claw 85 is attached to the transmitting device 61. When the transmitting device 61 reciprocates vertically, the claw 85 plucks the string 86 to create a sound. The sound producing device 80 having this "guitar-specification" can emit such sounds as resulting from continuously playing a string instrument such as a guitar or the like along with the rotation of the electric motor M. The upper surface of the housing 81 is formed with a through-hole 83 for the performance rod 84 and venting holes 82.

Figure 9:
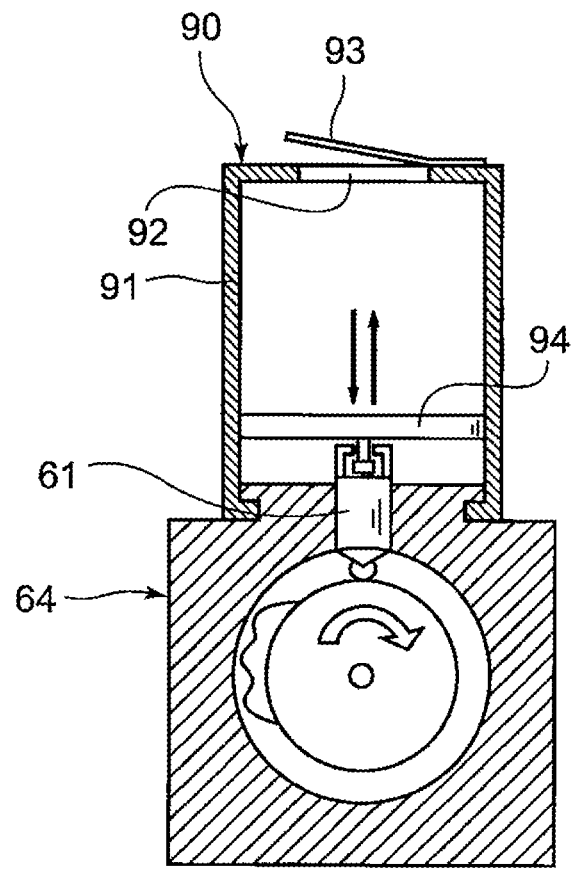
FIG. 9 is a schematic explanatory diagram illustrating sound producing device according to a third modified example of the present invention; and, FIG. 10 is a lateral view of a motorcycle-type motor driven two-wheeled vehicle provided with the vibration generating device and with sound producing device.

FIG. 9 is a schematic explanatory diagram of sound producing device 90 according to a third modified example of the present invention. In the present modified example, the inside of a housing 91 of the sound producing device 90 is used as a cylinder and an air piston 94 sliding along the inner circumference of the cylinder is attached to the transmitting device. The upper surface of the housing 91 is provided with a venting hole 92. A thin-plate-like reed valve 93 biased in the closing direction and being capable of being opened upward in the figure is installed at the venting hole 92. When the transmitting device 61 reciprocates vertically, the air piston 94 moves upward and downward to allow air to go into and come out of the venting hole 92. At this time, chatter sound occurs at a gap between the valve 93 and the venting hole 92. The sound producing device 90 with this "reed valve sound specification" can produce a predetermined chatter sound while minimizing the number of components absorbed by wear.

Figure 10:
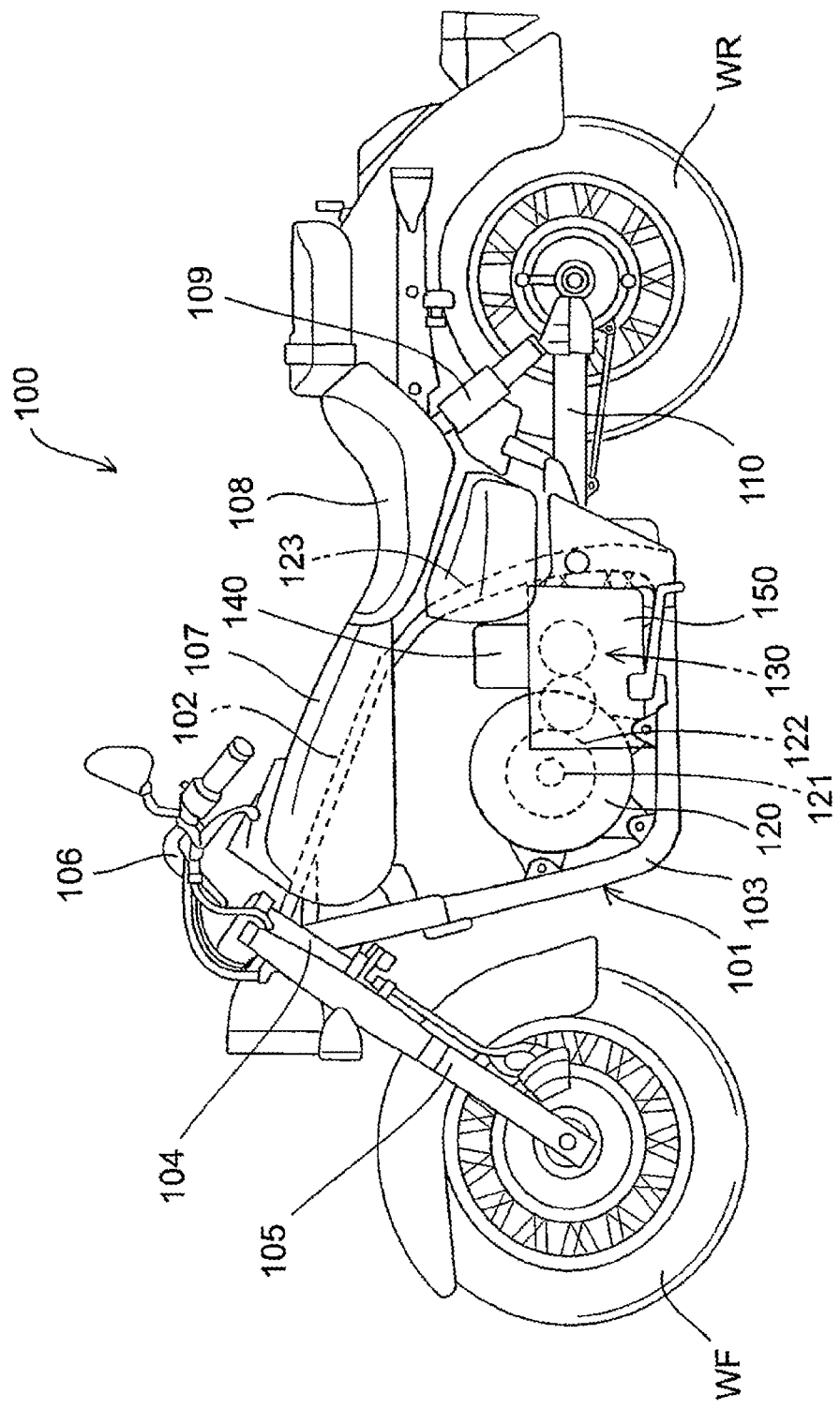

FIG. 10 is a lateral view of a motor driven two-wheeled vehicle 100 provided with vibration generating device and sound producing device. The vibration generating device and the sound producing device according to the present invention can be applied to various vehicles in addition to the scooter-type motor driven two-wheeled vehicle, as described above. The motor driven two-wheeled vehicle 100 is a motorcycle type motor driven two-wheeled vehicle allowed to travel by transmitting the rotational power of an electric motor 120 secured to a body frame 101 to a rear wheel WR via a speed reduction mechanism 150.

A head pipe 104 is secured to the front end portion of the body frame 101. A pair of left and right front forks 105 turnably supporting a front wheel WF is steerably mounted to the head pipe 104. A steering handlebar 106 is secured to the upper portions of the front forks 105. The body frame 101 mainly includes an upper tube 102, a down pipe 103 and a center frame 123. The upper tube 102 extends rearward of a vehicle body from the head pipe 104. The down pipe 103 extends downward from the head pipe 104 and suspends the electric motor 120. The center frame 123 is connected to the rear portion of the upper tube 102 and connected to the down pipe 103 at a lower portion of the vehicle body. A swing arm 110 turnably supporting a rear wheel WR is swingably mounted to the rear portion of the body frame 101. A swing arm 110 is suspended by the vehicle body via a rear cushion 109.

A battery 107 is disposed forward of a seat 108 on which an occupant sits. The battery 107 is covered by a teardrop-shaped cover and shaped to straddle the upper tube 102 from above. An electric motor 120 driven by electric power supplied from the battery 107 is mounted below the battery 107 and above the down pipe 103. The rotational power of the electric motor 120 is transmitted to the speed reduction mechanism 150 including a plurality of gear pairs via a reduction gear 122 secured to an output shaft 121 of the electric motor 120. The rotational power transmitted to the speed reduction mechanism 150 is transmitted to the rear wheel WR via a drive shaft (not shown) disposed inside the swing arm 110.

Vibration generating device 130 meshed with the reduction gear 122 for rotation is disposed inside the speed-reduction gear 150. The vibration generating device 130 can be composed of a single gear-pair including a gear constituting part of the speed reduction mechanism similarly to the embodiment described earlier. Sound producing device 140 is disposed above the speed reduction mechanism 150. Similar to the embodiment described earlier, the sound producing device 140 can also be driven by the power transmitted from the vibration generating device 130. In addition, the sound producing device 140 has e.g. "the drum specification" in which the film-like skin is hit with a striking rod to emit sounds. In this way, the sound similar to engine sound and vibration can be provided.

With the configuration described above, the vibrations caused by the vibration generating device 130 and the sound producing device 140 can be transmitted to the steering handlebar 106 and the seat 108 via the down pipe 103 or the center frame 123 from the electric motor 120 connected to the speed reduction mechanism 150. Since also the speed reduction mechanism 130 is mounted on the down pipe 103, vibrations can be transmitted from the speed-reduction mechanism 130 via the down pipe 103 or the center frame 123.

Incidentally, the vibration generating device 130 can be disposed at any position on the drive force transmission path between the electric motor 120 and the swing arm 110. For example, the vibration generating device 130 may be housed inside the speed reduction mechanism 150 as described above. Alternatively, the vibration generating device 130 may be disposed between the electric motor 120 and the speed reduction mechanism 150. Further, the drive force transmission between the electric motor 120 and the speed reduction mechanism can be performed by use of a chain, a belt or the like as well as the gear mechanism. The device for transmitting the rotational force from the speed reduction mechanism 150 to the rear wheel WR may use a chain, a belt or the like as well as the drive shaft mentioned above.

As described above, the motor driven vehicle according to the present invention includes the vibration generating device and the sound producing device installed on the drive force transmission path from the electric motor to the rear wheel. In response to the drive force thus transmitted, the vibration generating device generates vibration and the sound producing device produces sound. Therefore, arbitrary vibration and sound according to the rotation number of the electric motor can be generated using the drive force of the electric motor. In this way, the vibration and sound fitted with occupant's sensibilities can be obtained. Thus, it becomes easy for the occupant to sensuously grasp the conditions of the vehicle even in the motor driven vehicle travelling on the drive force of the electric motor.

Incidentally, the configuration, arrangement, etc. of the swing arm, the speed reduction mechanism, the electric motor, the vibration generating device and the sound producing device are not limited to the embodiments described above but can be modified in various ways. The vibration generating device and the sound producing device according to the present invention can be applied not only to the motor driven two-wheeled vehicles but also to various motor driven vehicles such as straddle-ride type three/four-wheeled vehicles.

DESCRIPTION OF REFERENCE SYMBOLS

1 ... Motor driven vehicle, 2 ... Head pipe, 12 ... Main frame, 13 ... High-voltage battery, 17 ... Swing arm, 19 ... Motor driver, 21 ... Swing arm pivot, 23 ... Pivot plate, 48 ... Output shaft, 42 ... Stator, 43 ... Rotor, 51 ... Drive side vibration generating unit, 51b ... Third reduction gear, 52 ... Driven side vibration generating unit, 52b ... Driven gear, 55 ... Weight, 54 ... Cam, 54a ... Cam lobe, 56 ... Vibration generating device, 60, 70, 80, 90 ... Sound producing device, 61 ... Transmitting device, 64 ... Support case, 65 ... Venting hole, 66 ... Housing, 67 ... Skin, 69 ... Striking rod, M ... Electric motor, WR ... Rear wheel.

What is claimed is:

1. A motor driven vehicle in which an electric motor is disposed in a vehicle-body-rear portion of a swing arm swingably supported by a body frame and the vehicle travels by transmitting the drive force of the electric motor to a rear wheel, the vehicle comprising:
a vibration generating device for generating vibration in accordance with the drive force, said vibration generating device being mounted to the swing arm at a location between the electric motor and the rear wheel.

2. The motor driven vehicle according to claim 1, wherein the vibration generating device comprises rotating bodies that become unbalanced during rotation.

3. The motor driven vehicle according to claim 2, wherein the rotating bodies are a gear pair partially embedded with a weight.

4. The motor driven vehicle according to claim 1, wherein the vibration generating device rotates a plurality of times for each rotation of the electric motor.

5. A motor driven vehicle in which an electric motor is disposed in a vehicle-body-rear portion of a swing arm swingably supported by a body frame and the vehicle travels by transmitting the drive force of the electric motor to a rear wheel, the vehicle comprising:
a vibration generating device for generating vibration in accordance with the drive force, installed on a drive force transmission path from the electric motor to the rear wheel,
wherein a sound producing device for producing a predetermined sound in accordance with the transmitted drive force is installed on the drive force transmission path from the electric motor to the rear wheel.

6. The motor driven vehicle according to claim 5, wherein the sound producing device is driven by a transmitting device reciprocating through contact with a cam attached to one of the rotating bodies.

7. The motor driven vehicle according to claim 6, wherein the cam is provided with a weight adapted to rotationally balance the cam, said weight being at a position opposed to a predetermined cam lobe formed on an outer circumferential portion of the cam.

8. The motor driven vehicle according to claim 6, wherein the vibration generating device and the sound producing device are each configured to be driven by a drive force taken from an axle of the rear wheel.

9. The motor driven vehicle according to claim 6, wherein at least a portion of the vibration generating device and the sound generating device are removable from the swing arm.

10. The motor driven vehicle according claim 6, wherein the sound producing device is disposed inside the swing arm at a position rearward of an axle of the rear wheel as viewed from the side of the vehicle body.

11. A motor driven vehicle in which an electric motor is disposed in a vehicle-body-rear portion of a swing arm swingably supported by a body frame and the vehicle travels by transmitting the drive force of the electric motor to a rear wheel, the vehicle comprising:
a vibration generating device for generating vibration in accordance with the drive force, said vibration generating device being installed on a drive force transmission path from the electric motor to the rear wheel; and,
a sound producing device for producing a predetermined sound in accordance with the transmitted drive force is installed on the drive force transmission path from the electric motor to the rear wheel;
wherein at least one of the vibration generating device and the sound producing device is disposed inside the swing arm at a position rearward of an axle of the rear wheel as viewed from the side of the vehicle body.

12. The motor driven vehicle according to claim 11, wherein the vibration generating device comprises rotating bodies that become unbalanced during rotation.

13. The motor driven vehicle according to claim 12, wherein the rotating bodies are a gear pair partially embedded with a weight.

14. The motor driven vehicle according to claim 11, wherein the vibration generating device rotates a plurality of times for each rotation of the electric motor.

15. The motor driven vehicle according to claim 11, wherein the sound producing device is driven by a transmitting device reciprocating through contact with a cam attached to one of the rotating bodies.

16. The motor driven vehicle according to claim 15, wherein the cam is provided with a weight adapted to rotationally balance the cam, said weight being at a position opposed to a predetermined cam lobe formed on an outer circumferential portion of the cam.

17. The motor driven vehicle according to claim 16, wherein the vibration generating device and the sound producing device are each configured to be driven by a drive force taken from an axle of the rear wheel.

18. The motor driven vehicle according to claim 17, wherein at least a portion of the vibration generating device and the sound generating device are removable from the swing arm.

* * * * *